(12) United States Patent
Gupta et al.

(10) Patent No.: US 8,700,800 B2
(45) Date of Patent: Apr. 15, 2014

(54) ROAMING OF CLIENTS BETWEEN GATEWAYS OF CLUSTERS OF A WIRELESS MESH NETWORK

(75) Inventors: Mukesh Gupta, Milpitas, CA (US); Ramanagopal Vogety, Milpitas, CA (US); Srikanth Chavali, Santa Clara, CA (US); Amalavoyal Chari, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 2099 days.

(21) Appl. No.: 11/355,091

(22) Filed: Feb. 15, 2006

(65) Prior Publication Data

US 2007/0192506 A1  Aug. 16, 2007

(51) Int. Cl.
*G06F 15/16* (2006.01)

(52) U.S. Cl.
USPC ........... 709/238; 709/239; 709/240; 709/241; 709/242; 709/244

(58) Field of Classification Search
USPC .................. 709/238, 239, 240, 241, 242, 244
See application file for complete search history.

(56) References Cited

U.S. PATENT DOCUMENTS

| | | | | |
|---|---|---|---|---|
| 5,768,529 | A * | 6/1998 | Nikel et al. | 709/232 |
| 6,601,101 | B1 * | 7/2003 | Lee et al. | 709/227 |
| 6,643,274 | B2 * | 11/2003 | D'Annunzio | 370/316 |
| 6,831,895 | B1 * | 12/2004 | Ji et al. | 370/237 |
| 7,151,759 | B1 * | 12/2006 | Ryan et al. | 370/332 |
| 7,254,637 | B2 * | 8/2007 | Pinkerton et al. | 709/230 |
| 7,406,539 | B2 * | 7/2008 | Baldonado et al. | 709/240 |
| 7,478,427 | B2 * | 1/2009 | Mukherjee et al. | 726/15 |
| 7,502,458 | B2 * | 3/2009 | Zino et al. | 379/220.01 |
| 7,864,706 | B1 * | 1/2011 | Zinjuwadia et al. | 370/254 |
| 7,930,424 | B1 * | 4/2011 | Nucci et al. | 709/238 |
| 7,978,594 | B2 * | 7/2011 | Kodialam et al. | 370/216 |
| 8,296,438 | B2 * | 10/2012 | Brown et al. | 709/227 |
| 2002/0133534 | A1 * | 9/2002 | Forslow | 709/200 |
| 2003/0112809 | A1 * | 6/2003 | Bharali et al. | 370/400 |
| 2004/0148430 | A1 * | 7/2004 | Narayanan | 709/238 |
| 2004/0224637 | A1 * | 11/2004 | Silva et al. | 455/63.4 |
| 2005/0003831 | A1 * | 1/2005 | Anderson | 455/456.1 |
| 2005/0030924 | A1 * | 2/2005 | Yano et al. | 370/332 |
| 2005/0195813 | A1 * | 9/2005 | Ambe et al. | 370/389 |
| 2005/0220148 | A1 * | 10/2005 | DelRegno et al. | 370/498 |
| 2005/0286412 | A1 * | 12/2005 | Hao et al. | 370/216 |
| 2006/0031846 | A1 * | 2/2006 | Jacobs et al. | 719/313 |
| 2006/0195607 | A1 * | 8/2006 | Naseh et al. | 709/238 |
| 2007/0297405 | A1 * | 12/2007 | He | 370/389 |

OTHER PUBLICATIONS

Fand et al., An Inter-Access Point Handoff Mechanism for Wireless Network Management: The Sabino System, Computer Science Department—University of Arizona, Lancaster University.

* cited by examiner

*Primary Examiner* — Tamara T Kyle
*Assistant Examiner* — Anthony Fabbri
(74) *Attorney, Agent, or Firm* — Brian R. Short

(57) ABSTRACT

A method and apparatus of allowing client roaming between gateways of a wireless mesh network is disclosed. The gateways are connected through a layer 3 network to an aggregation router. The method includes a first gateway sending a first route update to the aggregation router when a client joins a first cluster of the first gateway, the first gateway aging the route, and a second gateway sending a second route update to the aggregation router when the client roams to a second cluster of the second gateway.

8 Claims, 5 Drawing Sheets

ROAMING OF CLIENTS BETWEEN GATEWAYS OF CLUSTERS OF A WIRELESS MESH NETWORK

FIELD OF THE INVENTION

The invention relates generally to wireless communication. More particularly, the invention relates to an apparatus and method for providing roaming of clients between gateways of metro-mesh clusters.

BACKGROUND OF THE INVENTION

FIG. 1 shows a wireless mesh network. The network includes wireless access nodes 130, 140, 150, 160, 170 that provide data paths between a client 180 and gateways 110, 120. The gateways 110, 120 are connected to an upstream router 105, which can be connected to the internet 100.

As shown, the client 180 can roam from a first access node 160 to second access node 170. The first access node 160 is associated with a first cluster of a first gateway 110, and the second access node 170 is associated with a second cluster of a second gateway 120.

When the client 180 associates with an access node of a cluster, the gateway of the cluster sends a gratuitous (address resolution protocol) ARP to the upstream router 105. ARP is a protocol for the resolution of IP addresses to MAC addresses. The gratuitous ARP provides the upstream router 105 with an updated ARP cache entry associating the IP address of the client 180 to a MAC address of the gateway 120, so that the upstream router 105 knows where (which gateway) to send data traffic for the client. That is, the upstream router 105 sends the traffic to the gateway connected to the client based on the last received gratuitous ARP. In addition, the gateway 120 subsequently performs proxy ARP on behalf of the client 180 as long as the client remains within the cluster of the gateway 120. A proxy ARP entails the gateway 120 responding to ARP requests from the upstream router 105 for the IP address of the client 180 with a response containing a MAC address of the gateway 120.

Initially, the client 180 of FIG. 1 attaches to the first cluster and the first gateway 110 sends a gratuitous ARP. When the client 180 roams to second access node 170 of the cluster of the second gateway 120, the second gateway 120 sends a gratuitous ARP to the upstream router 105, which obsoletes the gratuitous ARP previously sent by the first gateway 110. Again, the upstream router 105 sends the traffic to the gateway connected to the client based on the last received gratuitous ARP. In this way, client mobility can be supported without requiring any special mobility software on the client and without requiring any non-standard behavior on the upstream router.

It is desirable to extend this mobility to address a scenario where an upstream router is separated from the gateways 110 and 120 by an intervening Layer 3 TCP/IP network. It is desirable to be able to do this while continuing to require no special mobility software on the client and no non-standard behavior required of the upstream router. It is also desirable to ensure that all traffic from the client be forced through the upstream router 105. The mesh network of FIG. 1 is limited because this configuration does not provide for client roaming when the upstream router is remotely located. A remotely located upstream router can advantageously provide services, such as authentication, authorization, accounting, subscriber management including per-user bandwidth controls, and dynamic host configuration protocol (DHCP) services. The DHCP server dynamically provides IP address assignments to client devices through the dynamic host configuration protocol. The dynamic host configuration protocol is a protocol for assigning dynamic IP addresses to devices on a network.

It is desirable to have an apparatus and method of client roaming between different clusters of a wireless mesh network. It is desirable that gateways of the wireless mesh network be connected to an upstream router through a layer three network, and be remotely located.

SUMMARY OF THE INVENTION

Methods and apparatus of providing fast client roaming between different gateways of different clusters of a wireless mesh network are disclosed. The gateways are connected to an aggregation router through a layer three network.

A first embodiment includes a method of allowing client roaming between gateways of a wireless mesh network, the gateways being connected through a layer 3 network to an aggregation router. The method includes a first gateway sending a first route update to the aggregation router when a client joins a first cluster of the first gateway. The first gateway ages the first route. Later, a second gateway sends a second route update to the aggregation router when the client roams to a second cluster of the second gateway.

Another embodiment includes a method of a wireless mesh network gateway aging a client route. The wireless mesh network gateway is connected to an aggregation router through a layer three network. The method includes the mesh network gateway assigning a cost function corresponding with the client route an initial value of zero when the mesh network gateway installs a client. The mesh network gateway then ages the client route by incrementing the cost function over time. The mesh network gateway updates the aggregation router with the cost function every time the cost function changes value.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention is readily understood by the following detailed description in conjunction with the accompanying drawings, wherein like reference numerals designate like structural elements, and in which.

DETAILED DESCRIPTION

The invention includes an apparatus and method of providing fast client roaming between gateways of different clusters of a wireless mesh network. The gateways are connected to a service gateway and aggregation router through a layer three network.

Remotely locating the service gateway and the aggregation route provides several advantageous features. First of all, services (such as services provided by an AAA server and DHCP server) can be remotely located from the wireless mesh network. Additionally, the wireless mesh network can be deployed such that use of backhaul of the wireless mesh network can be purchased from a third party. Additionally, multiple wireless mesh networks can be physically located in different locations while being managed by a centrally located network management system.

Figure 1:
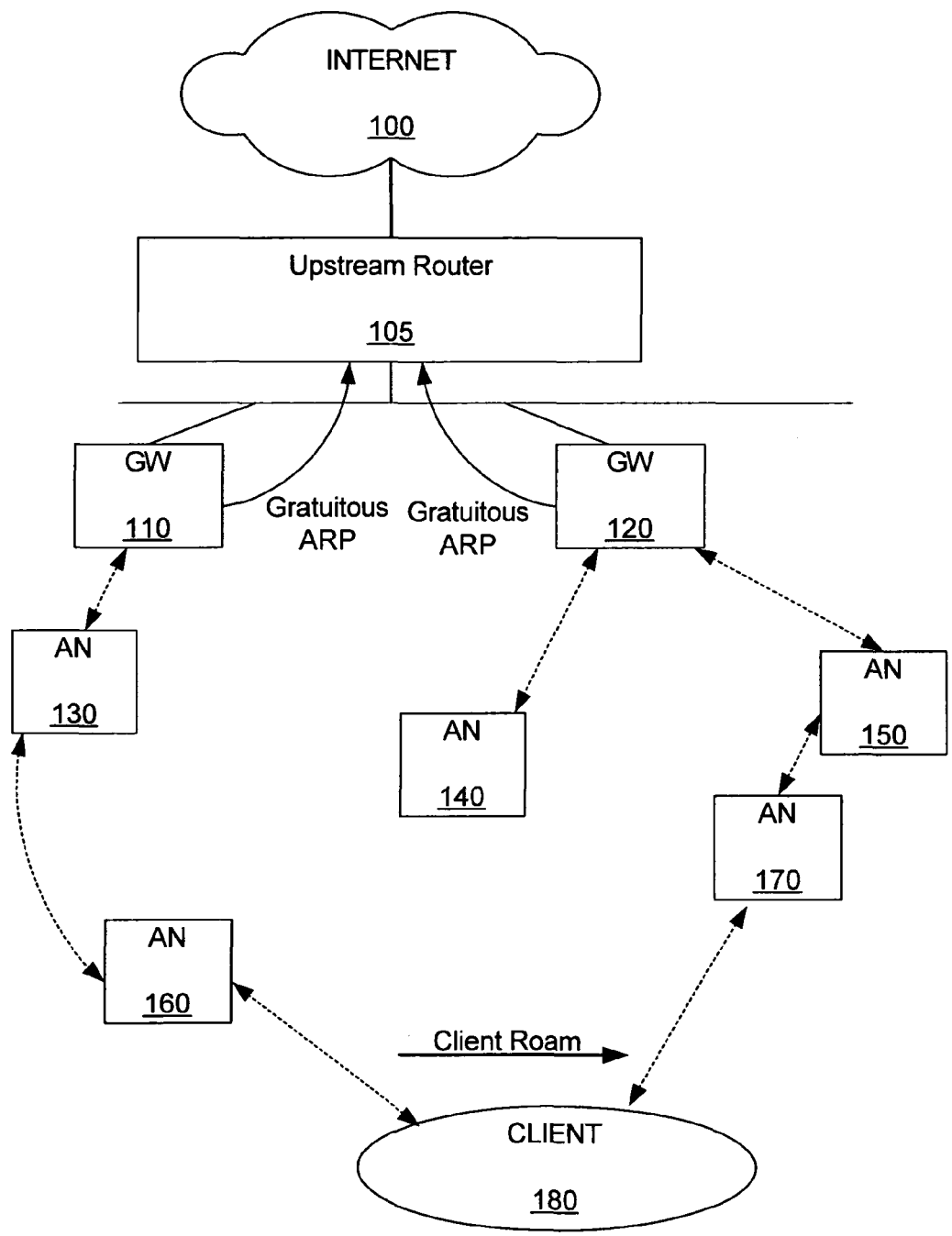
FIG. 1 shows a client roaming in a prior art wireless mesh network.
Figure 2:
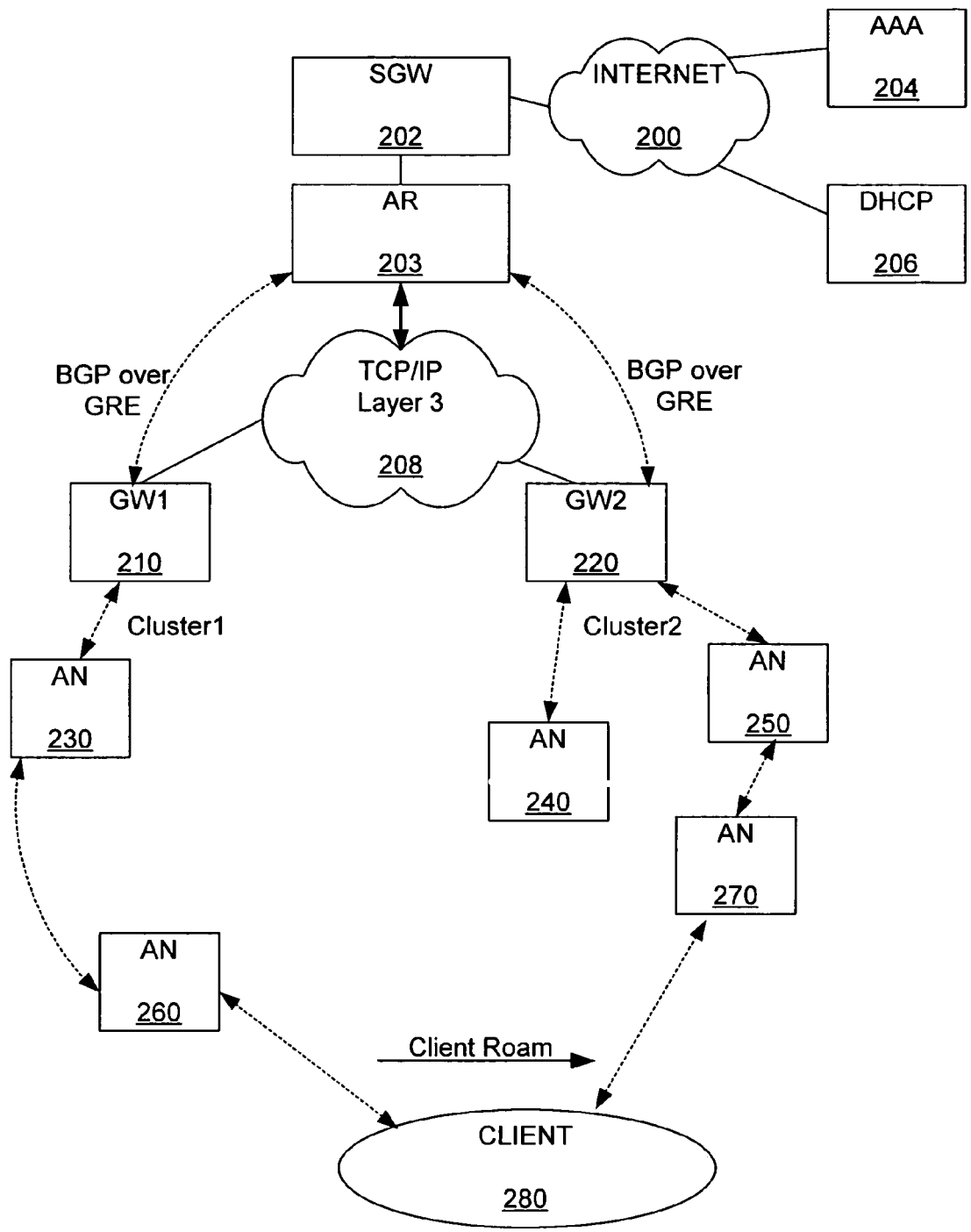
FIG. 2 shows a mesh network is which methods of client roaming between gateways of different cluster of a wireless mesh network can be utilized.

FIG. 2 shows a mesh network is which methods of client roaming between gateways of different cluster of a wireless mesh network can be utilized. The network includes gateways 210, 220 connected to an aggregation router 203 through a layer three TCP/IP network 208. The inclusion of the layer three TCP/IP network 208 is advantageous because the network 208 allows multiple user online sessions over multiple wireless mesh clusters to be managed from a remote central office that includes the aggregation router 203 and/or a service gateway 202. Additionally, the network 208 can be used to provide backhaul which can be purchased from a third party.

The service gateway 202 provides various IP services, such as, authenticating a client before allowing the client to access the internet. The service gateway may authenticate users through sending RADIUS requests to a RADIUS AAA server 204. The service gateway may present a login webpage to an end-user's (client's) http browser to force them to log in before being able to access the network. The service gateway can also keep track of accounting data for clients, and can send the accounting data to an AAA server 204.

An exemplary aggregation router 203 is a layer-3 router that is capable of terminating tunnel traffic, and capable of operating a routing protocol such as BGP (as will be described). The aggregation router 203 additionally can maintain and manage subscriber interfaces corresponding to each end-user and manage and maintain per-user bandwidth restrictions and policies. The aggregation router can manage user online sessions. The aggregation router 203 may also relay DHCP requests from clients to a DHCP server 206 and relay replies from the DHCP server 206 to the clients. The aggregation router may also keep track of accounting data for clients and may send user accounting data to the AAA server 204.

The exemplary embodiment as shown in FIG. 2 includes the service gateway 202, the DHCP server 206 and the AAA server 204 being connected to the internet 200.

The DHCP server 206 dynamically provides IP address assignments to client devices through the dynamic host configuration protocol. The dynamic host configuration protocol is a protocol for assigning dynamic IP addresses to devices on a network. With dynamic addressing, a device can have a different IP address every time it connects with the network. In some systems, the device's IP address can even change while it is still connected. DHCP also supports a mix of static and dynamic IP addresses.

The AAA server 204 provides ways to authenticate a client's identity, authorizing the client for services that the client has signed up for, and collecting accounting data for the client for billing purposes.

As shown, a first gateway 210 is within a first cluster that includes access nodes 230, 260. The second gateway 220 is within a second cluster that includes access nodes 240, 250, 270. Initially, a client 280 is attached to the access node 260 of the first cluster, and may roam to access node 270 of the second cluster.

The clusters of FIG. 2 are exemplary. That is, any number of access nodes can be included within the clusters of the wireless mesh network under a single gateway. A gateway can also serve as an access node and is distinguished from other access nodes in that it has available backhaul over an Ethernet port. The backhaul can take the form of any of several access methods including fiber, Ethernet and point-to-multipoint backhaul though a wireless subscriber module attached to the gateway over its Ethernet port. Additionally, any number of clusters can be included within the wireless mesh network. A cluster can be defined as a set of access nodes that are serviced by a single gateway.

An exemplary embodiment includes the gateways 210, 220 being connected to the aggregation router 203 through general routing encapsulation (GRE) tunnels over the layer three TCP/IP network 208. In this embodiment, the gateways run a border gateway protocol (BGP) over the GRE tunnel for updating the aggregation router 203 with routes to the client 280, allowing the aggregation router 203 to forward data traffic for the client 280 to the gateway that the client 280 is connected to.

BGP is a routing protocol for managing and communicating routes and route updates. It is a standard that is widely implemented on routers in the internet.

The route updates can be handled by other protocols than BGP. For example, the route updates can use an open shortest path first (OSPF) protocol or a routing information protocol (RIP).

When the client 280 attaches to an access node within a cluster, the gateway of the cluster installs a route for the client as soon as the gateway becomes aware of the attachment of the client. For example, when the client 280 attaches to the access node 260, the first gateway 210 installs a route for the client 280 as soon as the first gateway 210 becomes aware of the attachment of the client 280. The first gateway 210 propagates the client route upstream to the aggregation router 203, by sending a BGP route update to the aggregation router 203.

When the client 280 roams to the access node 270 of the second cluster, the second gateway 220 installs a route for the client 280 as soon as the second gateway 220 becomes aware of the attachment of the client 280. The second gateway 220 also propagates this client route upstream to the aggregation router 203 by sending a BGP route update to the aggregation router.

A problem can arise, however, due to the delay between when the first gateway 210 realizes that the client has left the first cluster, and the second gateway 220 installs a route for the client 280. For at least some implementations of BGP routing, the delay can be in the neighborhood of 10 seconds. After the first gateway 210 realizes the client 280 has left the first cluster, the first gateway 210 sends a BGP route update to the aggregation router 203 to delete the route to client through the first gateway 210. According to BGP implementations, the aggregation router 203 uses the existing client route (that is, to the first gateway 210) until the aggregation router 203 receives a better client route. For the client roaming from the first cluster to the second cluster, the aggregation router 203 uses the client route through the first gateway 210 for the 10 second delay until switching the client route of the second gateway 220. This delay is unacceptable.

The delay can be greatly reduced or eliminated by providing a cost function with the route updates to the aggregation router 203. More specifically, the client routes are aged with time, thereby allowing the aggregation router 203 to more intelligently select the more current route to the client. This intelligence eliminates the delay between the time the client route is updated with a new client route, and the time the aggregation router 203 installs the new client route.

An embodiment for aging the client route of a gateway includes, for example, the gateways incrementing a cost function associated with the client route over time. For example, the first gateway 210 can set the cost function to zero when installing a client route, and incrementing the cost function every predetermined unit of time. Periodic BGP updates over the GRE tunnel to the aggregation router contain the cost function corresponding to the client route. When the client roams to a cluster of the second gateway 220, the second gateway sets a cost function of the new route to zero (for example) when installing the client route, and increments the cost function every predetermined unit of time. Therefore, the client route corresponding to the gateway that most recently installed a client route, has the lowest value cost function. In the period just after the client has roamed to the second cluster, the aggregation router receives BGP route updates for the client (containing the different cost functions for the client route as computed by each gateway) from both gateways 210 and 220. The aggregation router uses the cost functions of the client routes of the gateways to determine which of the gateways corresponds to the correct (most current) client route. This eliminates the above-described delay.

Methods of Client Roaming

Figure 3:
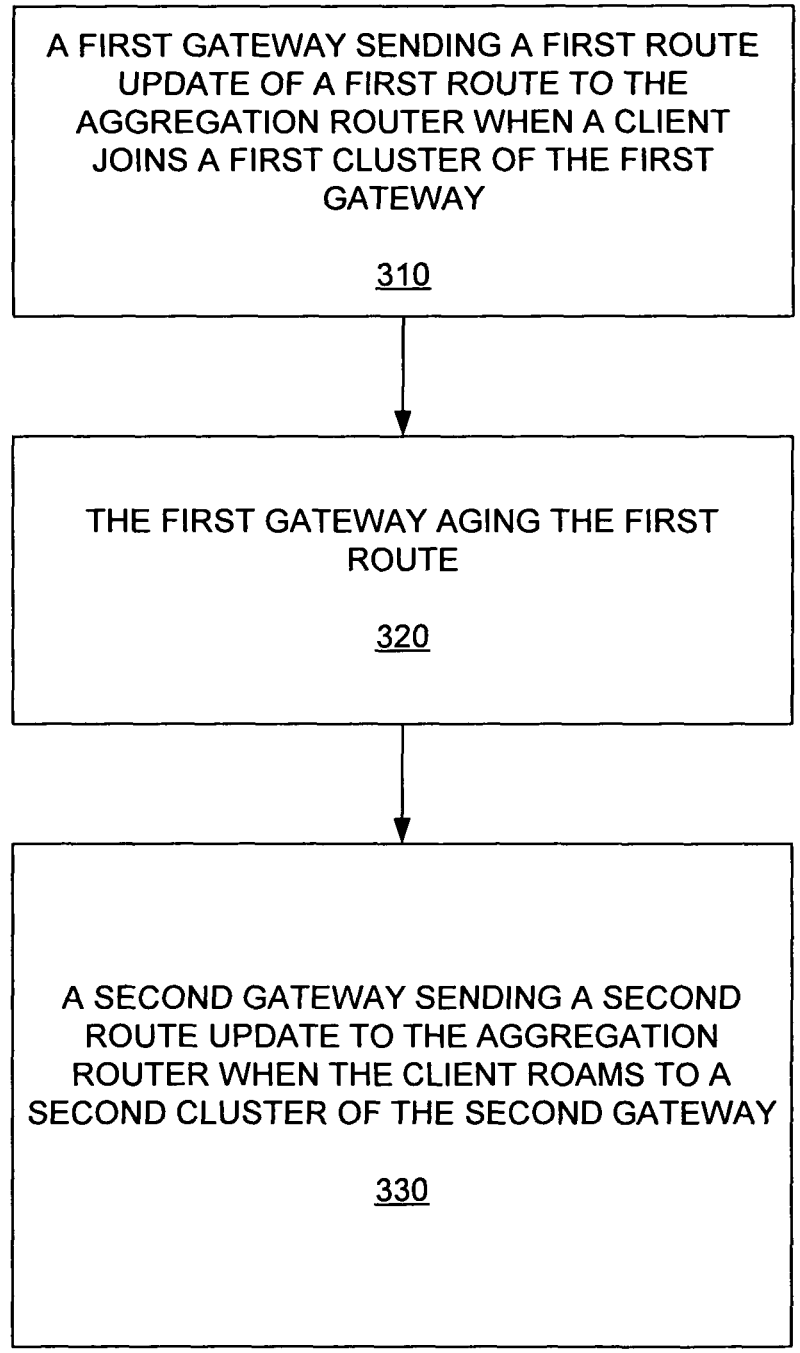
FIG. 3 is a flow chart that includes steps of an exemplary method of client roaming between gateways of different cluster of a wireless mesh network.

FIG. 3 is a flow chart that includes steps of an exemplary method of client roaming between gateways of different cluster of a wireless mesh network. For this method, the gateways are connected through a layer 3 network to an aggregation router. A specific implementation includes gateways being connected to an aggregation router across a layer three network through tunnels. A first step 310 of the method includes a first gateway sending a first route update of a first route to the aggregation router when a client joins a first cluster of the first gateway. A second step 320 includes the first gateway aging the first route. A third step 330 includes a second gateway sending a second route update to the aggregation router when the client roams to a second cluster of the second gateway.

The aggregation router uses the BGP route update that has the lowest cost function for determining which of the gateways corresponds to the correct (most current) client route. As described, the cost function for each client route is incremented as the client route ages.

Tunnels

The gateways can be connected to the aggregation router across a layer three network through tunnels. Generally, tunneling includes packets being encapsulated within other higher application protocol packets, such as, IP, UDP or TCP. Exemplary tunnels include GRE tunnels, IP in IP tunnels (IP packets in IP packets) and L2TP (layer 2 tunnel protocol). As stated, packets are encapsulated within other packets. Other protocols that provide this can equivalently be used.

Figure 4:
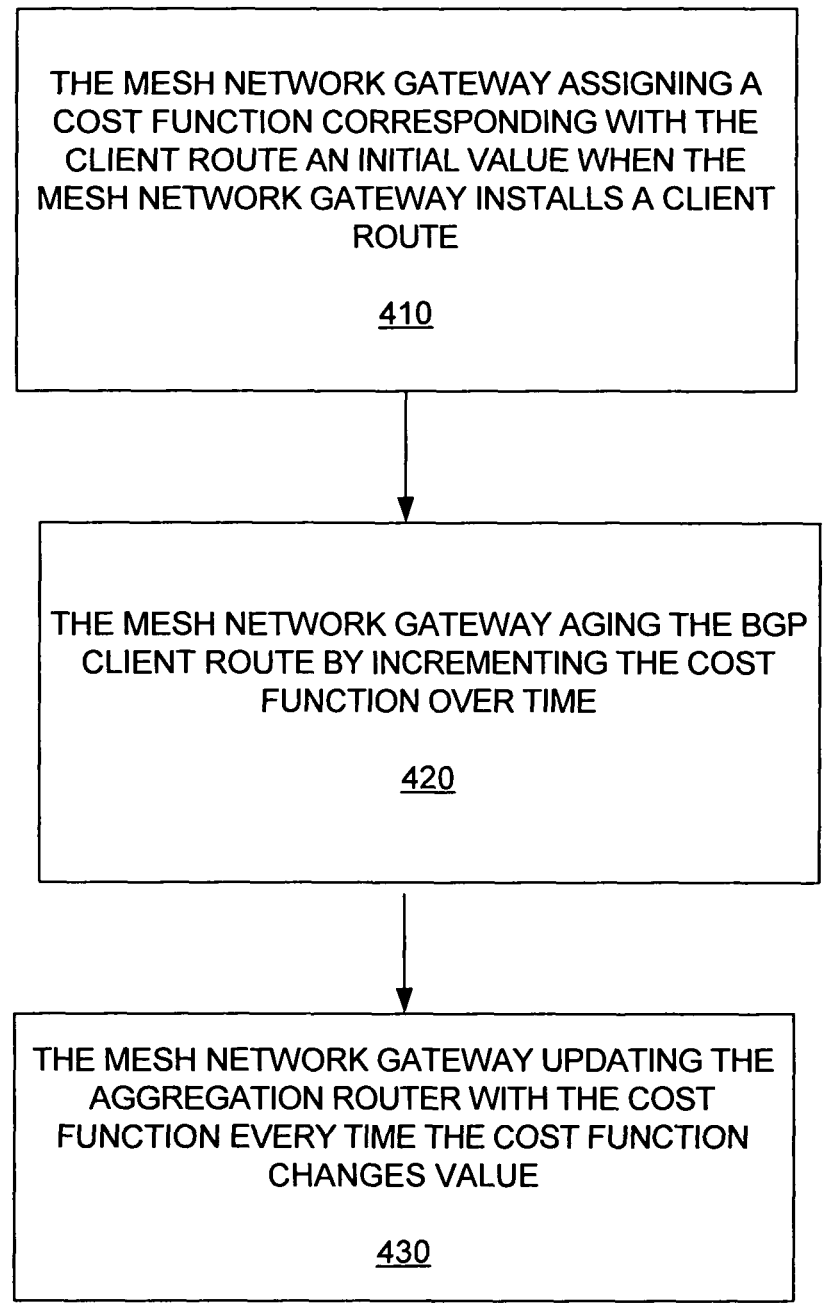
FIG. 4 is a flow chart that includes steps of an exemplary method of a gateway for client roaming between gateways of different cluster of a wireless mesh network.

FIG. 4 is a flow chart that includes steps of an exemplary method of a wireless mesh network gateway. The method provides for client roaming between gateways of different clusters of a wireless mesh network. The wireless mesh network gateways are connected to an aggregation router. The connection can be, but is not required, to be through a layer three network. A first step 410 of the method includes the mesh network gateway assigning a cost function corresponding with the client route an initial value of zero when the mesh network gateway installs a client. A second step 420 includes the mesh network gateway aging the client route by incrementing the cost function over time. A third step 430 includes the mesh network gateway updating the aggregation router with the cost function every time the cost function changes value.

Aging of the Client Route

Figure 5:
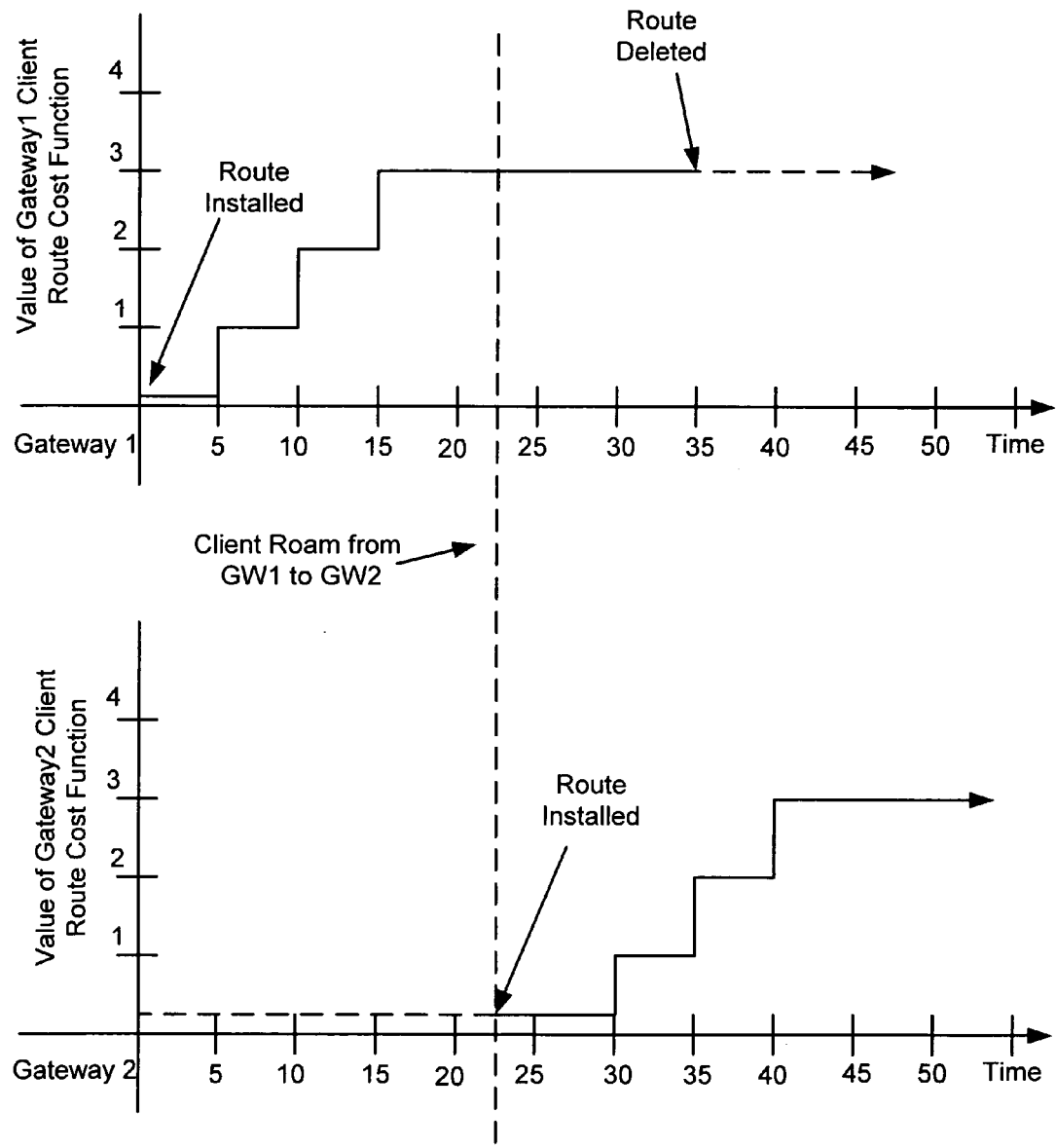
FIG. 5 shows a time line that depicts aging of routes corresponding to gateways of the wireless mesh network.

FIG. 5 shows time lines that depict exemplary aging of routes corresponding to gateways of the wireless mesh network. A first time line shows a value of a cost function of a first client route of the first gateway (GW1), and a second time line shows a value of a cost function of a second client route of the second gateway (GW2).

As shown, at the time the first gateway installs the client route, the value of the cost function of the client route installed by the first gateway is zero. The first gateway ages the client route by incrementing the cost function over time. For the example shown in FIG. 5, the cost function is incremented every five seconds, and caps out at a value of 3 after 15 seconds. The cost function then maintains its value until the first client route is deleted approximately 10 seconds after the client roams to the other cluster of the second gateway (GW2).

Also as shown, at the time the second gateway installs its client route, the value of the cost function of the client route installed by the second gateway is zero. For the example shown in FIG. 5, the cost function is incremented every five seconds, and caps out at a value of 3 after 15 seconds.

The aggregation router that the first and second gateways are connected to (through a layer three TCP/IP network) uses the cost function to determine the proper client route. Therefore, when the first gateway installs a client route at time zero, the aggregation router uses the client route of the first gateway having a cost function value of zero. When the client roams to the cluster of the second gateway, the second gateway installs a new route having a cost function value of zero. At this point, the cost function value of the route installed by the first gateway has a value of 3. Therefore, the aggregation router uses the client route installed by the second gateway because the value of the cost function of the client route of the second gateway is less than the value of the cost function of the client route of the first gateway.

The method of aging the client routes as shown in FIG. 5 are exemplary. That is, the cost functions can be incremented at time intervals different than five seconds, and by increments different than one. The cost functions shown in FIG. 5 are capped at 3. However, other cap values can be used. The initial value can be set to zero, or another initial cost function value.

The aging of the client routes is generally implemented with software that is operable on the gateways. An exemplary embodiment of the software is a computer program operable on a processing unit of a mesh network gateway. The mesh network gateway is connected to an aggregation router through a layer three network. When executed, the computer program assigns a cost function corresponding with a BGP client route (clearly, other routing protocols could be used as well) an initial value of zero when the mesh network gateway installs a client. The BGP client route is aged by incrementing the cost function over time. The aggregation router is updated with the cost function every time the cost function changes value. As previously described, the BGP client route is aged by incrementing the cost function once every set period of time, and the cost function can be capped at a maximum value.

Although specific embodiments of the invention have been described and illustrated, the invention is not to be limited to the specific forms or arrangements of parts so described and illustrated. The invention is limited only by the appended claims.

What is claimed:

1. A method of allowing client roaming between gateways of a wireless mesh network, the gateways being connected to an aggregation router across a layer three network through tunnels, the method comprising:

a first gateway of the wireless mesh network sending a first client route update of a first client route to the aggregation router when a client joins a first cluster of the first gateway, wherein the first cluster includes a first plurality of access nodes, and the first client route includes at least one wireless access node of the first client route between the first gateway and the client device;

the first gateway assigning a first cost function corresponding with the first client route an initial value when the first gateway sends the first client route update to the aggregation router;

the first gateway aging the first client route by incrementing the first cost function over time, and periodically updating the aggregation router with the incremented first cost function;

a second gateway of the wireless mesh network sending a second client route update of a second client route to the aggregation router when the client roams to a second cluster of the second gateway, wherein the second cluster includes a second plurality of access nodes, and the second client route includes at least one wireless access node of the second client route between the second gateway and the client device;

the second gateway assigning a second cost function corresponding with the second client route an initial value when the second gateway sends the second client route update to the aggregation router;

the second gateway aging the second client route by incrementing the second cost function over time, and periodically updating the aggregation router with the incremented second cost function;

the aggregation router using the first and second incremented cost functions of the first and second routes of the first gateway and the second gateway to determine which of the first gateway or the second gateway corresponds with a current client route.

2. The method of claim 1, wherein the tunnels comprise GRE tunnels.

3. The method of claim 1, wherein the tunnels comprise IP in IP tunnels.

4. The method of claim 1, wherein the tunnels comprise L2TP tunnels.

5. The method of claim 1, wherein the first client route update and the second client route update comprise BGP route updates.

6. The method of claim 5, wherein the client route updates enable the aggregation router to update its route to the client based upon a cost function corresponding with each of the BGP route updates.

7. The method of claim 5, wherein first client route update and the second client route update enable the aggregation router to use a route to the client that corresponds with a BGP route having a lowest cost function.

8. The method of claim 6, wherein a cost function corresponding with a first BGP route is assigned an initial value when the first gateway installs the first client route, and the first client route is aged by incrementing the cost function.

* * * * *